United States Patent
Roesler

(10) Patent No.: US 9,027,350 B2
(45) Date of Patent: May 12, 2015

(54) GAS TURBINE ENGINE HAVING DOME PANEL ASSEMBLY WITH BIFURCATED SWIRLER FLOW

(75) Inventor: Timothy Carl Roesler, Plainfield, IN (US)

(73) Assignee: Rolls-Royce Corporation, Indianapolis (IN)

( * ) Notice: Subject to any disclaimer, the term of this patent is extended or adjusted under 35 U.S.C. 154(b) by 1112 days.

(21) Appl. No.: 12/912,066

(22) Filed: Oct. 26, 2010

(65) Prior Publication Data

US 2011/0154825 A1    Jun. 30, 2011

Related U.S. Application Data

(60) Provisional application No. 61/291,113, filed on Dec. 30, 2009.

(51) Int. Cl.
| | | |
|---|---|---|
| *F23R 3/14* | (2006.01) | |
| *F23R 3/28* | (2006.01) | |
| *F23R 3/46* | (2006.01) | |
| *F23R 3/50* | (2006.01) | |

(52) U.S. Cl.
CPC . *F23R 3/14* (2013.01); *F23R 3/286* (2013.01); *F23R 3/46* (2013.01); *F23R 3/50* (2013.01); *Y02T 50/675* (2013.01)

(58) Field of Classification Search
CPC .................................. F23R 3/14; F23R 3/286
USPC ................... 60/748, 737, 749, 752, 755, 756; 239/399, 403, 405, 406, 423, 424
See application file for complete search history.

(56) References Cited

U.S. PATENT DOCUMENTS

| | | | | |
|---|---|---|---|---|
| 2,621,018 | A | * 12/1952 | Barrett ...................... | 416/201 R |
| 2,676,460 | A | * 4/1954 | Brown ............................ | 60/742 |
| 3,498,055 | A | * 3/1970 | Faitani et al. ................... | 60/776 |
| 4,216,652 | A | * 8/1980 | Herman et al. ................. | 60/748 |
| 4,689,961 | A | * 9/1987 | Stratton ........................ | 60/748 |
| 4,870,818 | A | 10/1989 | Suliga | |
| 4,914,918 | A | * 4/1990 | Sullivan ......................... | 60/756 |
| 5,956,955 | A | 9/1999 | Schmid | |

(Continued)

FOREIGN PATENT DOCUMENTS

| | | | |
|---|---|---|---|
| EP | 0153842 A1 | 9/1985 | |
| EP | 0678708 A2 | 10/1995 | |
| WO | WO 2009005516 A2 | * 1/2009 | ............... F23R 3/28 |

OTHER PUBLICATIONS

Extended European Search Report in corresponding European application (i.e., 10 850 919.1), mailed Jan. 20, 2015 (7 pages).

*Primary Examiner* — William H Rodriguez
*Assistant Examiner* — Rene Ford
(74) *Attorney, Agent, or Firm* — Krieg DeVault LLP

(57) ABSTRACT

A gas turbine engine including a combustor with a combustion liner having inner and outer walls is disclosed herein. The gas turbine engine further includes a swirler system adapted to receive a fuel injector and a flow splitter operable to bifurcate an airflow exiting the swirler system into a first bifurcated flow and a second bifurcated flow. A shroud is positioned downstream of the flow splitter and is configured to deflect the first bifurcated flow in a first direction radially inward and the second bifurcated flow in a second direction radially outward. The second bifurcated flow cools both of the inner and outer walls of the combustor liner.

11 Claims, 3 Drawing Sheets

(56) References Cited

U.S. PATENT DOCUMENTS

| | | |
|---|---|---|
| 6,199,367 B1 | 3/2001 | Howell |
| 6,405,523 B1 * | 6/2002 | Foust et al. ............... 60/776 |
| 6,484,489 B1 | 11/2002 | Foust et al. |
| 6,547,163 B1 | 4/2003 | Mansour et al. |
| 6,735,950 B1 | 5/2004 | Howell et al. |
| 6,865,889 B2 * | 3/2005 | Mancini et al. ............ 60/737 |
| 6,959,551 B2 * | 11/2005 | Baudoin et al. ............ 60/748 |
| 6,978,618 B2 | 12/2005 | Pacheco-Tougas et al. |
| 6,983,599 B2 | 1/2006 | Young et al. |
| 7,010,923 B2 * | 3/2006 | Mancini et al. ............ 60/776 |
| 7,051,532 B2 | 5/2006 | Howell et al. |
| 7,225,996 B2 * | 6/2007 | Kobayashi et al. .......... 239/88 |
| 7,621,131 B2 * | 11/2009 | Von Der Bank ............ 60/737 |
| 7,658,075 B2 * | 2/2010 | von der Bank ............. 60/737 |
| 7,891,191 B2 * | 2/2011 | Yoshida et al. ............. 60/740 |
| 7,921,650 B2 * | 4/2011 | Oda et al. .................. 60/748 |
| 8,297,057 B2 * | 10/2012 | Toon ......................... 60/746 |
| 2002/0178732 A1 * | 12/2002 | Foust et al. ................ 60/776 |
| 2004/0079086 A1 * | 4/2004 | Smith et al. ............... 60/776 |
| 2007/0214791 A1 * | 9/2007 | Schumacher et al. ....... 60/750 |
| 2008/0229753 A1 | 9/2008 | Li et al. |
| 2009/0113893 A1 | 5/2009 | Li et al. |
| 2010/0162714 A1 * | 7/2010 | Rice et al. ................. 60/748 |

\* cited by examiner

GAS TURBINE ENGINE HAVING DOME PANEL ASSEMBLY WITH BIFURCATED SWIRLER FLOW

CROSS REFERENCE TO RELATED APPLICATIONS

The present application claims the benefit of U.S. Provisional Patent Application 61/291,113, filed Dec. 30, 2009, and is incorporated herein by reference.

FIELD OF THE INVENTION

The present invention relates to gas turbine engines, and more particularly, to a dome panel assembly with bifurcated swirler flow for a gas turbine engine combustor.

BACKGROUND

Gas turbine engine combustor systems remain an area of interest. Some existing systems have various shortcomings, drawbacks, and disadvantages relative to certain applications. Accordingly, there remains a need for further contributions in this area of technology.

SUMMARY

Embodiments of the present invention include a unique gas turbine engine and a unique dome panel assembly for a gas turbine engine combustor. Other embodiments include apparatuses, systems, devices, hardware, methods, and combinations for gas turbine engines, gas turbine engine combustor systems and dome panel assemblies for gas turbine engine combustion system. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
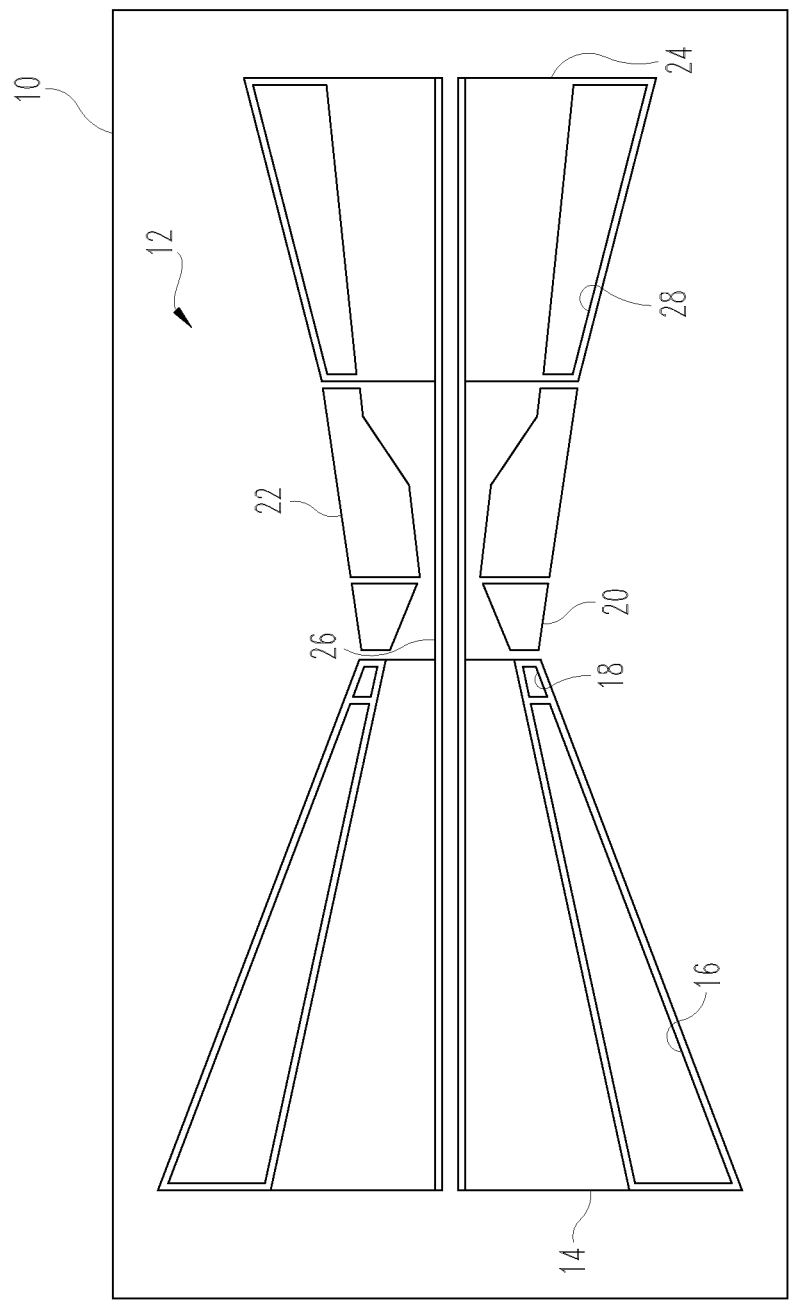
FIG. 1 schematically depicts a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a non-limiting example of a gas turbine engine 10 in accordance with an embodiment of the present invention is schematically depicted. In one form, gas turbine engine 10 is an axial flow machine, e.g., an air vehicle propulsion power plant. In other embodiments, gas turbine engine 10 may be a centrifugal flow machine or a combination axial centrifugal flow machine. It will be understood that embodiments of the present invention include various gas turbine engine configurations, for example, including turbojet engines, turbofan engines, turboprop engines, and turboshaft engines having axial, centrifugal and/or axi-centrifugal compressors and/or turbines.

In the illustrated embodiment, gas turbine engine 10 includes an engine core 12. Engine core 12 includes a compressor 14 having a plurality of blades and vanes 16 with outlet guide vanes (OGV) 18, a diffuser 20, a combustor 22 and a turbine 24. Diffuser 20 and combustor 22 are fluidly disposed between OGV 18 of compressor 14 and turbine 24. Turbine 24 is drivingly coupled to compressor 14 via a shaft 26. Although only a single spool is depicted, it will be understood that the present invention is equally applicable to multi-spool engines. In various embodiments, gas turbine engine 10 may include, in addition to engine core 12, one or more fans, additional compressors and/or additional turbines.

During the operation of gas turbine engine 10, air is supplied to the inlet of compressor 14. Blades and vanes 16 compress air received at the inlet of compressor 14, and after having been compressed, the air is discharged via OGV 18 into diffuser 20. Diffuser 20 reduces the velocity of the pressurized air from compressor 14, and directs the pressurized air to combustor 22. Fuel is mixed with the air and combusted in combustor 22, and the hot gases exiting combustor 22 are directed into turbine 24.

Turbine 24 includes a plurality of blades and vanes 28. Blades and vanes 28 extract energy from the hot gases to generate mechanical shaft power to drive compressor 14 via shaft 26. In one form, the hot gases exiting turbine 24 are directed into a nozzle (not shown), which provides thrust output the gas turbine engine. In other embodiments, additional turbine stages in one or more additional rotors may be employed, e.g., in multi-spool gas turbine engines.

Figure 2:
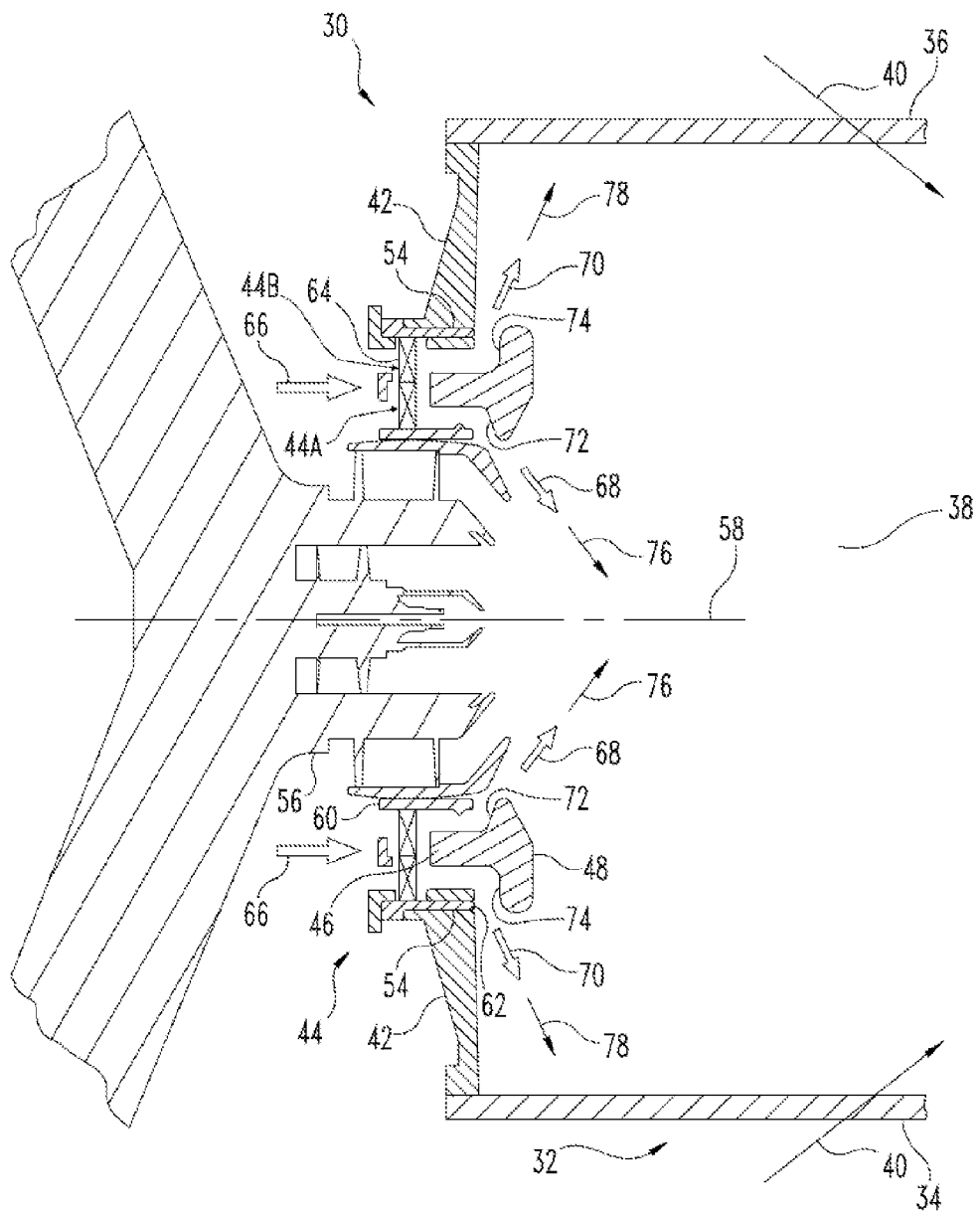
FIG. 2 is a cross section depicting a non-limiting example of a dome panel assembly in a gas turbine engine combustor in accordance with an embodiment of the present invention.
Figure 3:
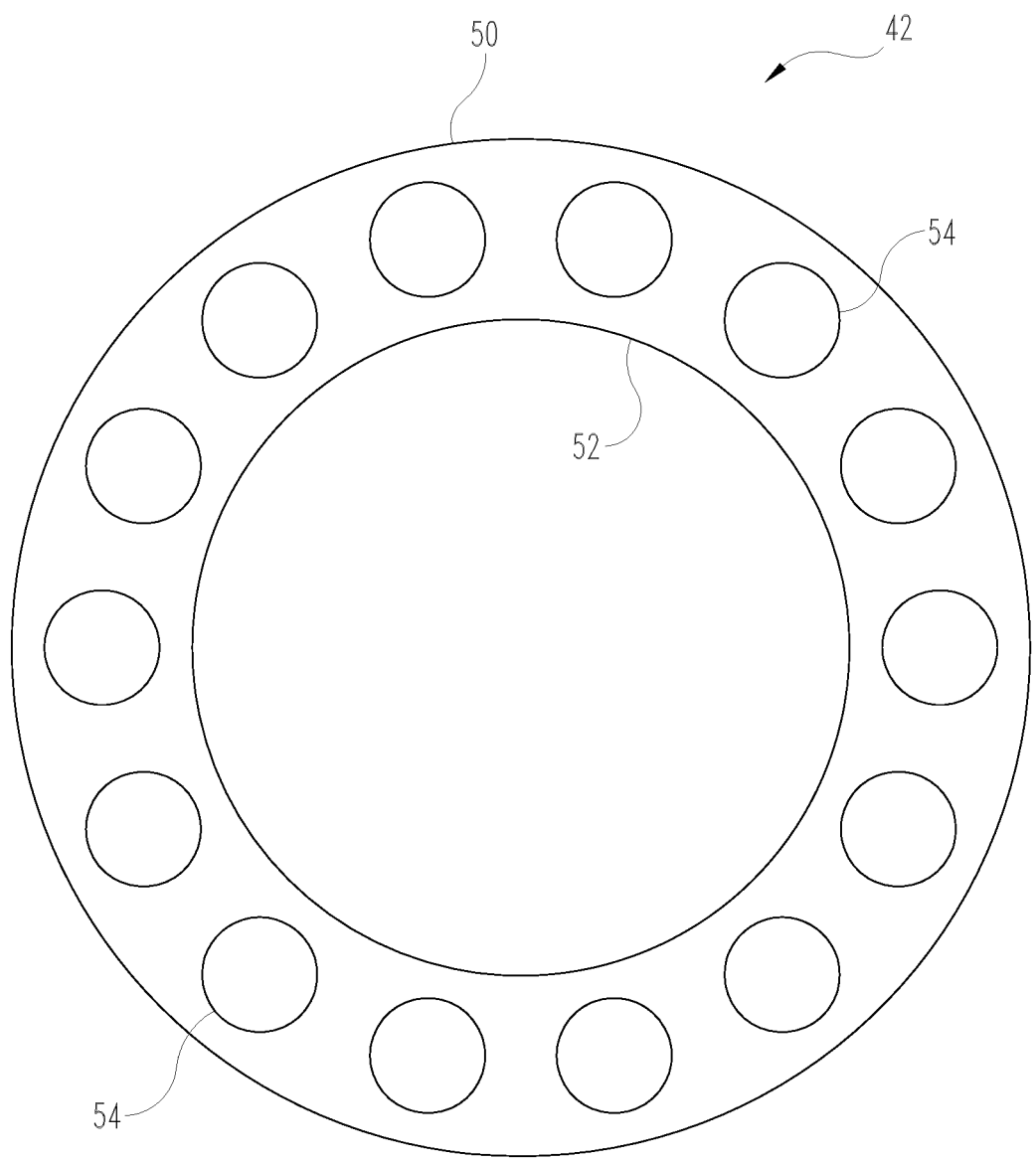
FIG. 3 depicts a non-limiting example of a dome panel in accordance with an embodiment of the present invention.

Referring now to FIGS. 2 and 3, aspects of a non-limiting embodiment of combustor 22 are described. In one form, combustor 22 is an annular combustor. In other embodiments, other combustor configurations may be employed, such as can combustors and can-annular combustors. Combustor 22 includes a dome panel assembly 30 and a combustion liner 32. Combustion liner 32 includes an inner wall 34 and an outer wall 36. Inner wall 34 and outer wall 36 are spaced apart in the radial direction to form an annulus extending around the centerline of engine core 12. In one form, dome panel assembly 30 is coupled to inner wall 34 and outer wall 36. Dome panel assembly 30 and combustion liner 32 define a combustion chamber 38. In some embodiments, inner wall 34 and outer wall 36 are structured to permit cooling air 40 to flow through inner wall 34 and/or outer wall 36 into combustion chamber 38 in order to prevent excess temperatures in inner wall 34 and/or outer wall 36. For example, some embodiments of inner wall 34 and/or outer wall 36 include film and/or impingement cooling passages (not shown).

In one form, dome panel assembly 30 includes a dome panel 42, a plurality of swirler systems 44, a flow splitter 46 and a shroud 48. Dome panel 42 is defined by an outer periphery 50, an inner periphery 52, and includes a plurality of openings 54 (FIG. 3). Each opening 54 is adapted to receive a swirler system 44. In other embodiments, dome panel 42 may include only a single opening 54 for one or more swirler systems 44. Each swirler system 44 is adapted to receive a fuel injector 56. Fuel injector 56 has a centerline 58.

In one form, each swirler system 44 includes an inner band 60, an outer band 62 and a plurality of swirler vanes 64. Inner band 60 pilots fuel injector 56 within swirler system 44. Swirler system 44 is piloted within opening 54 of dome panel 42 by outer band 62. Swirler vanes 64 are positioned within the annulus formed by inner band 60 and outer band 62, and extend between inner band 60 and outer band 62. In one form, inner band 60, outer band 62 and swirler vanes 64 are integrally formed together as a unitary structure, e.g., a casting. In other embodiments, one or more of inner band 60, outer band 62 and swirler vanes 64 are individually formed and assembled together to yield each swirler system 44.

During the operation of gas turbine engine 10, an airflow 66 enters swirler system 44. Flow splitter 46 is positioned downstream of swirler vanes 64 to bifurcate airflow 66 into a bifurcated flow 68 and a bifurcated flow 70. In one form, inner band 60, outer band 62, swirler vanes 64 and flow splitter 46 combine to form two swirlers, e.g., swirlers 44A and 44B, wherein swirler 44A is perimetrically disposed around fuel injector 56, and wherein swirler 44B is perimetrically disposed around swirler 44A.

Shroud 48 is positioned downstream of flow splitter 46. In one form, flow splitter 46 and shroud 48 are integrally formed together as a unitary structure. In other embodiments, flow splitter 46 and shroud 48 may be discrete components. In another form, swirler system 44, flow splitter 46 and shroud 48 are integrally formed together as a unitary structure. In still other embodiments, one or more of swirler system 44, flow splitter 46 and shroud 48 may be formed as discrete components and assembled together.

Shroud 48 is structured to deflect bifurcated flow 68 and bifurcated flow 70. In particular, shroud 48 includes a deflector surface 72 for deflecting bifurcated flow 68, and includes a deflector surface 74 for deflecting bifurcated flow 70. The shapes of deflector surface 72 and deflector surface 74 may be selected to meet the needs of the particular application, and are not limited to the shape depicted in FIG. 2 or any other particular shape. Deflector surface 72 is structured to direct bifurcated flow 68 into a first direction 76 having a component that is inward toward centerline 58 of fuel injector 56. In some embodiments, the inner swirling air of bifurcated flow 68 may reduce combustor-generated smoke, and may increase combustor efficiency. The direction 76 of bifurcated flow 68 may be selected to meet the needs of the particular application, and is not limited to the direction depicted in FIG. 2. Deflector surface 74 is structured to direct bifurcated flow 70 into a second direction 78 with a component that is outward from centerline 58 of fuel injector 56. In one form, bifurcated flow 70 is directed toward both inner wall 34 and outer wall 36 of combustion liner 32. In some embodiments the outer swirling air of bifurcated flow 70 cools metallic surfaces of combustor 22, e.g., dome panel 42 and combustion liner 32, and may also extend lean blowout limits. The direction 78 of bifurcated flow 70 may be selected to meet the needs of the particular application, and is not limited to the direction depicted in FIG. 2. In other embodiments, bifurcated flow 68 and/or bifurcated flow 70 may be additionally directed toward other locations.

Embodiments include a gas turbine engine, comprising: a compressor; a turbine, a combustor fluidly disposed between the compressor and the turbine, including: a swirler system adapted to receive a fuel injector; and a flow splitter positioned to bifurcate an airflow exiting the swirler system into a first bifurcated flow and a second bifurcated flow.

In a refinement, the combustor includes a shroud positioned downstream of the flow splitter and structured to deflect at least one of the first bifurcated flow and the second bifurcated flow.

In another refinement, the shroud includes a first deflector surface for deflecting the first bifurcated flow, and wherein the shroud includes a second deflector surface for deflecting the second bifurcated flow.

In yet another refinement, the shroud is structured to direct the first bifurcated flow into a first direction.

In still another refinement, the first direction is inward toward a centerline of the fuel injector.

In a further refinement, the shroud is structured to direct the second bifurcated flow into a second direction.

In a yet further refinement, the second direction includes a component that is outward from a centerline of the fuel injector.

In a still further refinement, the combustor includes a dome panel having an opening adapted to receive the swirler system.

In another refinement, the combustor includes a combustion liner having an outer wall coupled to the dome panel and an inner wall coupled to the dome panel, and wherein the second direction is towards the outer wall and towards the inner wall.

Another embodiment includes a dome panel assembly for a gas turbine engine combustion system, comprising: a dome panel having an opening; a swirler system disposed in the opening and adapted to receive a fuel injector; and a flow splitter positioned to bifurcate an airflow exiting the swirler system into a first bifurcated flow and a second bifurcated flow.

In a refinement, the dome panel assembly includes a shroud positioned downstream of the flow splitter and structured to deflect the first bifurcated flow and the second bifurcated flow.

In another refinement, the shroud includes a first deflector surface for deflecting the first bifurcated flow, and wherein the shroud includes a second deflector surface for deflecting the second bifurcated flow.

In yet another refinement, the shroud is structured to direct the first bifurcated flow inward toward a centerline of the fuel injector and to direct the second bifurcated flow outward from a centerline of the fuel injector.

In still another refinement, the shroud and the flow splitter are integrally formed together as a unitary structure.

In yet still another refinement, the swirler system includes a first swirler perimetrically disposed around the fuel injector; and a second swirler perimetrically disposed around the first swirler.

In further refinement, the swirler system is a unitary structure.

Embodiments include a dome panel assembly for a gas turbine engine, comprising: a dome panel having an opening; means for swirling air, wherein the means for swirling air is disposed in the opening, and wherein the means for swirling air is positioned adjacent to a location for a fuel injector; and means for bifurcating an airflow exiting the means for swirling air into a first bifurcated flow and a second bifurcated flow.

In a refinement, the dome panel assembly further comprises means for deflecting the first bifurcated flow and the second bifurcated flow.

In another refinement, the means for deflecting directs the first bifurcated flow inward toward a centerline of the fuel injector and directs the second bifurcated flow outward from a centerline of the fuel injector.

In yet another refinement, the means for bifurcating and the means for deflecting are integrally formed together as a unitary structure.

In still another refinement, the means for swirling air, the means for bifurcating and the means for deflecting are integrally formed together as a unitary structure.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a compressor;
   a turbine; and
   a combustor fluidly disposed between said compressor and said turbine, including:
      a combustion liner having inner and outer walls;
      a dome panel including an opening adapted to receive first and second swirlers and only a single fuel injector wherein the single fuel injector has a centerline;
      wherein the first swirler is perimetrically disposed around the fuel injector and is configured to produce a first swirling air and wherein the second swirler is perimetrically disposed around the first swirler and is configured to produce a second swirling air;
      a flow splitter positioned to bifurcate said first swirling air and second swirling air exiting said swirler system into a first bifurcated flow of inner swirling air and a second bifurcated flow of outer swirling air; and
      a shroud positioned downstream of said flow splitter and configured to deflect said first bifurcated flow of inner swirling air in a first direction radially inward toward the centerline and said second bifurcated flow of outer swirling air in a second direction radially outward of the fuel injector and radially outward from the centerline, wherein the flow of the second swirling air in the second direction cools both of the inner and outer walls of the combustor liner.

2. The gas turbine engine of claim 1, wherein said shroud includes a first deflector surface for deflecting said first bifurcated flow, and wherein said shroud includes a second deflector surface for deflecting said second bifurcated flow.

3. The gas turbine engine of claim 1, wherein said second direction includes only a component that is outward from a centerline of said fuel injector.

4. The gas turbine engine of claim 1, wherein said outer wall is coupled to said dome panel and said inner wall is coupled to said dome panel.

5. A dome panel assembly for a gas turbine engine combustion system having an inner wall spaced radially apart from an outer wall, comprising:
   a dome panel having an opening with a centerline;
   a swirler system including first and second swirlers disposed in said opening and adapted to receive a fuel injector, the fuel injector being disposed only radially inward of the swirler system;
   wherein the swirler system includes an inner band and an outer band, wherein the inner band pilots the fuel injector within the swirler system, and wherein the swirler system is piloted within the opening in the dome panel by the outer band;
   wherein the first swirler is perimetrically disposed around the fuel injector and is configured to produce a first swirling air and wherein the second swirler is perimetrically disposed around the first swirler and is configured to produce a second swirling air;
   a flow splitter positioned to bifurcate said first swirling air and said second swirling air exiting said swirler system into a first bifurcated flow of inner swirling air and a second bifurcated flow of outer swirling air; and
   a shroud positioned downstream of said flow splitter and configured to deflect said first bifurcated flow of inner swirling air radially inward toward the centerline and said second bifurcated flow of outer swirling air radially outward of the fuel injector and radially outward from the centerline to cool said inner and outer walls.

6. The dome panel assembly of claim 5, wherein said shroud includes a first deflector surface for deflecting said first bifurcated flow, and wherein said shroud includes a second deflector surface for deflecting said second bifurcated flow.

7. The dome panel assembly of claim 5, wherein said shroud and said flow splitter are integrally formed together as a unitary structure.

8. The dome panel assembly of claim 5, wherein said swirler system is a unitary structure.

9. A dome panel assembly for a gas turbine engine, comprising:
   a dome panel having an opening with a centerline;
   an inner combustion liner disposed radially inward from an outer combustion liner;
   means for swirling air, wherein said means for swirling air is disposed in said opening, and wherein said means for swirling air is positioned adjacent to a location for a fuel injector, wherein the fuel injector is disposed only radially inward of the means for swirling air; and
   means for bifurcating an airflow exiting said means for swirling air into a first bifurcated flow and a second bifurcated flow, the means for bifurcating being positioned downstream of the means for swirling air; and
   means for deflecting the first bifurcated flow radially inward toward the centerline and deflecting the second bifurcated flow radially outward of the fuel injector and radially outward from the centerline to cool each of the inner and outer combustion liners.

10. The dome panel assembly of claim 9, wherein said means for bifurcating and said means for deflecting are integrally formed together as a unitary structure.

11. The dome panel assembly of claim 10, wherein said means for swirling air, said means for bifurcating and said means for deflecting are integrally formed together as a unitary structure.

* * * * *